Figure 1:
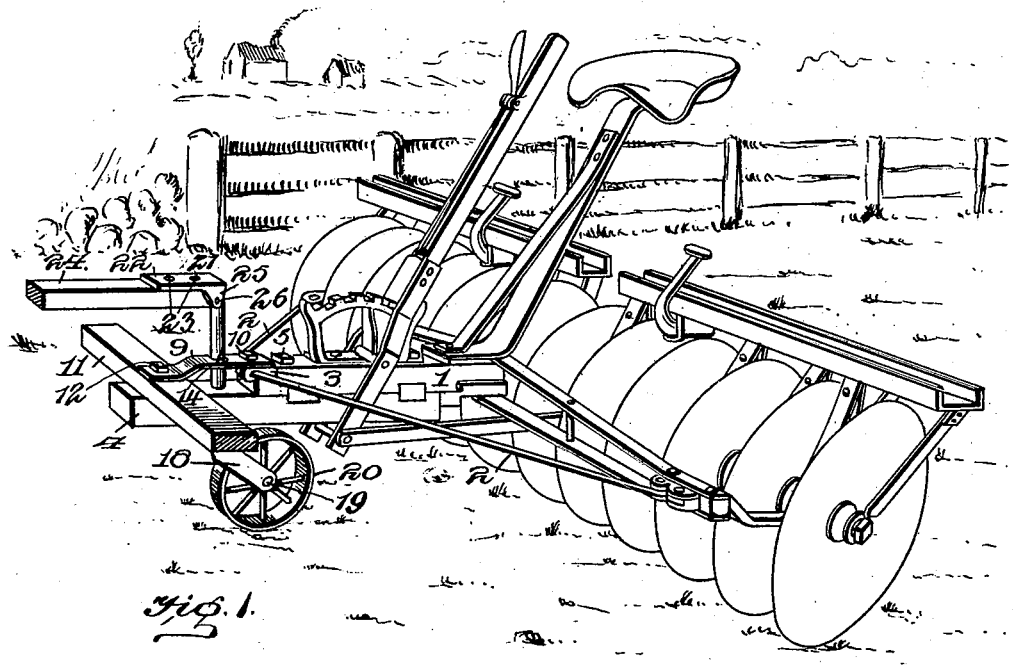

No. 677,658.    Patented July 2, 1901.
H. J. HEIDER.
DISK HARROW ATTACHMENT.
(Application filed Jan. 12, 1901.)

(No Model.)

Witnesses
Geo. A. Byrne
R. M. Smith

Inventor
Henry J. Heider
By
C. G. Siggers
Attorney

UNITED STATES PATENT OFFICE.

HENRY J. HEIDER, OF TEMPLETON, IOWA.

DISK-HARROW ATTACHMENT.

SPECIFICATION forming part of Letters Patent No. 677,658, dated July 2, 1901.

Application filed January 12, 1901. Serial No. 43,063. (No model.)

*To all whom it may concern:*

Be it known that I, HENRY J. HEIDER, a citizen of the United States, residing at Templeton, in the county of Carroll and State of Iowa, have invented a new and useful Disk-Harrow Attachment, of which the following is a specification.

This invention relates to disk-harrow attachments, the object in view being to provide a device in the form of an attachment which may be readily applied to a harrow for the purpose of supporting the forward portion thereof and relieving the animals from the weight of the implement.

One of the objects of the invention is to provide an attachment of such construction that it may be substituted for the ordinary draft-pole or tongue which is found upon harrows and other agricultural implements and also to make provision whereby the draft-pole or tongue may be connected with the attachment.

It is also the object of the present invention to provide the attachment with a supporting-wheel mounted on the swivel-post, having means whereby the draft-pole or tongue may be connected therewith, so that the supporting-wheel will travel in line with the direction in which the draft-pole or tongue extends, thus facilitating the turning of corners.

While the attachment hereinafter described is especially designed with reference to disk harrows, it will be apparent as the description proceeds that such attachment may be applied to other forms of harrows and to different kinds of agricultural implements used in cultivating the soil.

The invention consists in an attachment for the purpose specified embodying certain novel features and details of construction, as hereinafter fully described, illustrated in the drawings, and pointed out in the claims.

Figure 2:
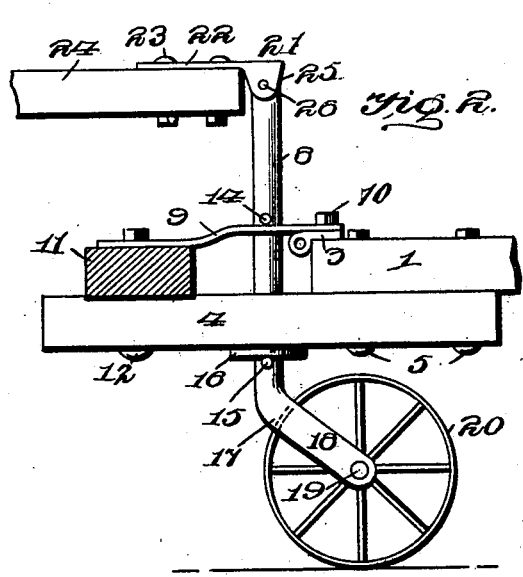
Figure 3:
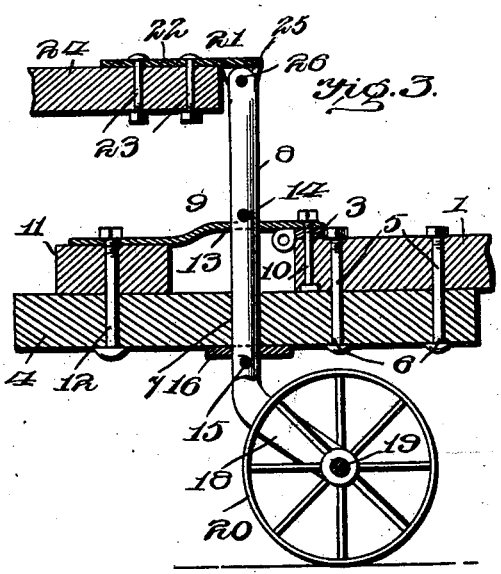

In the accompanying drawings, Figure 1 is a perspective view of a disk harrow, showing the improved attachment applied thereto in place of the usual draft-pole or tongue. Fig. 2 is an enlarged side elevation of the attachment, showing the manner of connecting the same to the harrow-frame and also the manner of attaching the draft-pole or tongue. Fig. 3 is a vertical longitudinal section through the same.

Similar numerals of reference designate corresponding parts in all the figures of the drawings.

For the purpose of illustrating the use and application of the attachment which forms the subject-matter of the present invention I have in Fig. 1 illustrated a disk harrow of well-known type at present in use. It will not be necessary to enter into a detailed description of the harrow, as said implement forms no part of the present invention. It may, however, be stated that 1 designates the main longitudinally and centrally disposed frame-bar of the harrow, and 2 the oblique braces, which are connected at their rear ends to the harrow-frame and attached at their forward convergent ends to a clip 3, which is ordinarily secured to the forward end of the frame-bar 1, as clearly illustrated in the several views. Under the ordinary construction the tongue or draft-pole is bolted to the under side of the frame-bar 1.

In carrying out the present invention the ordinary tongue or draft-pole is disconnected from the frame-bar 1, and the coupling-bar 4, forming an element of the present invention, is substituted for said pole or tongue and connected thereto by the same bolts 5 which previously were utilized for bolting the tongue to the frame, the said coupling-bar being provided with vertical openings 6 to receive the bolts 5, as clearly illustrated in Figs. 2 and 3. In this way the coupling-bar 4 is rigidly connected to the frame-bar 1 and forms a forwardly-projecting extension thereof.

The coupling-bar 4 is provided at a suitable point between its ends with a vertical opening 7, forming a bearing for the swivel-post 8, which extends through the coupling-bar and also through a metal hammer-strap 9, which is connected at its rear end to the clip 3 by means of a bolt 10 or in any other convenient manner, the forward end of the hammer-strap being depressed, so as to bear against the upper side of the whiffletree or evener 11, which is pivotally mounted on the forward end of the coupling-bar 4 and connected thereto by means of a pivot-bolt 12, which passes through the coupling-bar, whiffletree, and the hammer-strap 9, as clearly shown in Fig. 3, the pivot-bolt 12 being thus supported at its opposite ends, while the whiffletree is interposed between the hammer-strap and coupling-bar. The hammer-strap is also provided with an opening 13 in line with and above the opening 7 in the coupling-bar, thereby forming an additional bearing for the swivel-post 8.

The swivel-post 8 is provided with transverse openings for the purpose of receiving a pair of stop-pins 14 and 15, located, respectively, above the hammer-strap 9 and below the coupling-bar 4. Interposed between the lower pin 15 and the lower surface of the coupling-bar is a wear-collar 16, against which the pin 15 works, the upper pin 14 working against the upper surface of the hammer-strap. In this way the swivel-post is prevented from moving up or down, while at the same time it is left free to turn on its longitudinal axis.

At its lower end the swivel-post 8 is provided with a supporting-wheel frame 17, which is preferably shown in the form of a fork, the blades 18 of which receive the axle 19, upon which the supporting-wheel 20 is journaled. The supporting-wheel may be of any suitable diameter which will adapt it to work beneath the coupling-bar when applied to the harrow-frame and is preferably provided with a broad rim or tread, so that it will roll smoothly upon the surface of the ground.

Connected with the upper end of the swivel-post is a pivotal head 21, which comprises a main body portion 22 in the form of a flat plate provided with one or more openings to receive bolts 23, adapted to pass through corresponding openings in the draft-pole or tongue 24 for connecting the said pole fixedly and rigidly to the pivotal head. The head is further provided at its rear end with depending twin ears 25, which embrace the upper end of the swivel-post 8 and receive a pin or bolt 26, which passes through the ears 25 and the swivel-post 8 and establishes a pivotal connection between the said post and head.

From the foregoing description it will be seen that a plurality of bearings are provided for the swivel-post and that said bearings are spaced apart, so as to give, in effect, an elongated bearing for the post to enable it to withstand the draft applied to the upper end thereof. It will also be seen that the draft-pole is connected directly to the upper end of the swivel-post and that when the tongue or pole is moved to one side or the other the swivel-post will turn and the supporting-wheel will also be turned at an angle corresponding to the angle of the pole or tongue, thus greatly facilitating the turning of the machine.

The attachment may be readily and quickly applied to any of the ordinary forms of disk harrows and other agricultural implements by removing the tongue or pole thereof and substituting the attachment and afterward applying the draft-pole or tongue to the pivotal head on the swivel-post. The attachment relieves the draft-animals from the weight which is ordinarily imposed upon them by the forward portion of the harrow or other implement, and in this and other ways referred to materially facilitates the operation of the machine in the field.

From the foregoing description it is thought that the construction, operation, and many advantages of the herein-described disk-harrow attachment will be readily apparent to those skilled in the art without further description, and it will be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. An attachment for the purpose specified, comprising a swiveled post, a supporting-wheel connected therewith, a coupling-bar through which the post passes, a pivotal head on the post, and a draft-pole directly attached to and made rigid with the pivotal head, whereby the pole has a vertical as well as a horizontal movement.

2. An attachment for the purpose specified, comprising a swivel-post, a supporting-wheel connected therewith, means for connecting a draft-pole to said post, a hammer-strap formed with an opening to receive the swivel-post, and a coupling-bar forming attaching means for connecting the device to a farming implement.

3. An attachment for the purpose specified, comprising a swivel-post, a supporting-wheel connected therewith, means for connecting a draft-pole to said post, a coupling-bar having a bearing for said post, a hammer-strap formed with an opening to receive the post, and a whiffletree interposed between the hammer-strap and coupling-bar.

4. An attachment for the purpose specified, comprising a swivel-post, a supporting-wheel connected therewith, means for connecting a draft-pole to said post, a coupling-bar in which the post is journaled, a hammer-strap formed with an opening to receive said post, and stop-pins carried by the post and arranged one above the hammer-strap and one beneath the coupling-bar.

5. An attachment for the purpose specified comprising a swivel-post, a supporting-wheel connected therewith, and a pivotal head on the post adapted to connect with a draft-pole, said head comprising a body portion adapted to be bolted to the pole, and parallel ears embracing and pivotally connected to the upper end of the swivel-post.

In testimony that I claim the foregoing as my own I have hereto affixed my signature in the presence of two witnesses.

HENRY J. HEIDER.

Witnesses:
F. M. WILSON,
J. L. WALDMAN.